United States Patent
Yuan et al.

(10) Patent No.: US 7,953,577 B2
(45) Date of Patent: May 31, 2011

(54) METHOD AND APPARATUS FOR IMPROVED FAULT DETECTION IN POWER GENERATION EQUIPMENT

(75) Inventors: Chao Yuan, Plainsboro, NJ (US); Claus Neubauer, Monmouth Junction, NJ (US); Zehra Cataltepe, Red Bank, NJ (US)

(73) Assignee: Siemens Corporation, Iselin, NJ (US)

(*) Notice: Subject to any disclaimer, the term of this patent is extended or adjusted under 35 U.S.C. 154(b) by 1102 days.

(21) Appl. No.: 11/202,861

(22) Filed: Aug. 12, 2005

(65) Prior Publication Data

US 2006/0074595 A1    Apr. 6, 2006

Related U.S. Application Data

(60) Provisional application No. 60/604,374, filed on Aug. 25, 2004.

(51) Int. Cl.
G06F 11/30 (2006.01)
G21C 17/00 (2006.01)
(52) U.S. Cl. .................. 702/185; 702/182
(58) Field of Classification Search .......... 702/104, 702/116, 182, 189, 183, 185
See application file for complete search history.

(56) References Cited

U.S. PATENT DOCUMENTS

| | | | |
|---|---|---|---|
| 5,223,207 A | 6/1993 | Gross et al. | |
| 5,410,492 A | 4/1995 | Gross et al. | |
| 5,459,675 A | 10/1995 | Gross et al. | |
| 5,586,066 A | 12/1996 | White et al. | |
| 5,629,872 A | 5/1997 | Gross et al. | |
| 5,680,409 A | 10/1997 | Qin et al. | |
| 5,745,382 A | 4/1998 | Vilim et al. | |
| 5,761,090 A | 6/1998 | Gross et al. | |
| 5,764,509 A | 6/1998 | Gross et al. | |
| 5,774,379 A | 6/1998 | Gross et al. | |
| 5,987,399 A | 11/1999 | Wegerich et al. | |
| 6,107,919 A | 8/2000 | Wilks et al. | |
| 6,119,111 A | 9/2000 | Gross et al. | |
| 6,131,076 A | 10/2000 | Stephan et al. | |
| 6,161,905 A * | 12/2000 | Hac et al. ................ | 303/146 |
| 6,181,975 B1 | 1/2001 | Gross et al. | |
| 6,202,038 B1 | 3/2001 | Wegerich et al. | |

(Continued)

FOREIGN PATENT DOCUMENTS

WO WO 01/48571 A1    7/2001

OTHER PUBLICATIONS

Sensor, Wikipedia, pp. 1, 6. Modified date Aug. 7, 2008.*

(Continued)

*Primary Examiner* — Michael P Nghiem (57) ABSTRACT

A method and apparatus for detecting faults in power plant equipment is discloses using sensor confidence and an improved method of identifying the normal operating range of the power generation equipment as measured by those sensors. A confidence is assigned to a sensor in proportion to the residue associated with that sensor. If the sensor has high residue, a small confidence is assigned to the sensor. If a sensor has a low residue, a high confidence is assigned to that sensor, and appropriate weighting of that sensor with other sensors is provided. A feature space trajectory (FST) method is used to model the normal operating range curve distribution of power generation equipment characteristics. Such an FST method is illustratively used in conjunction with a minimum spanning tree (MST) method to identify a plurality of nodes and to then connect those with line segments that approximate a curve.

33 Claims, 5 Drawing Sheets

U.S. PATENT DOCUMENTS

| | | | |
|---|---|---|---|
| 6,240,372 B1 | 5/2001 | Gross et al. | |
| 6,245,517 B1 | 6/2001 | Chen et al. | |
| 6,356,911 B1* | 3/2002 | Shibuya | 707/101 |
| 6,366,833 B1* | 4/2002 | Fukuyama | 701/1 |
| 6,609,036 B1 | 8/2003 | Bickford | |
| 6,625,569 B2 | 9/2003 | James et al. | |
| 6,748,280 B1* | 6/2004 | Zou et al. | 700/31 |
| 6,892,163 B1 | 5/2005 | Herzog et al. | |
| 6,944,566 B2* | 9/2005 | Chen et al. | 702/116 |
| 7,293,400 B2* | 11/2007 | Taware et al. | 60/39.27 |
| 2001/0049590 A1* | 12/2001 | Wegerich | 702/189 |
| 2004/0002776 A1* | 1/2004 | Bickford | 700/30 |
| 2004/0006398 A1* | 1/2004 | Bickford | 700/30 |

OTHER PUBLICATIONS

Sensor, Answers, printed date Sep. 2, 2008.*

Measure, Answers, printed date Sep. 2, 2008.*

Diao Y. et al, "Fault Diagnosis for a Turbine Engine", Control Engineering Practice, vol. 12, Elsevier Ltd 2004, pp. 1151-1165.

Han Z., "Fault Detection and Isolation in the Presence of Process Uncertainties", Control Engineering Practice, vol. 13, Elsevier Ltd 2004, pp. 587-599.

Venkatasubramanian V et al, "A Review of Process Fault Detection and Diagnosis Part I: Quantitative Model-Based Methods", Computers and Chemical Engineering, vol. 27, Elsevier Ltd 2003.

* cited by examiner

METHOD AND APPARATUS FOR IMPROVED FAULT DETECTION IN POWER GENERATION EQUIPMENT

This patent application claims the benefit of U.S. Provisional Application No. 60/604,374, filed Aug. 25, 2004, which is hereby incorporated by reference herein in its entirety.

BACKGROUND OF THE INVENTION

Large machinery, such as power generation equipment, is typically very expensive to purchase, install, maintain and operate. Accordingly, determining whether such equipment is operating within desired operating parameters is important. Detecting conditions that indicate that the equipment is operating outside these desired parameters, which may result in damage to the equipment is, therefore, also important. In order to detect such conditions, sensors are typically used to measure operating parameters, such as pressure, temperature, etc., of various components and, if a predetermined threshold for a particular parameter is crossed by a particular measurement, a fault is declared. Recently, learning techniques for fault detection systems have become more prevalent in attempts to improve the accuracy of determining whether a fault exists. Well-known techniques, such as neural networks, multivariate state estimation techniques (MSET) and fuzzy logic have been used for such purposes. All such methods use historical data, collected by a plurality of sensors and indicative of past normal operations and fault conditions, to generate a model that is used to monitor future data generated by operations of the equipment. If the future data deviates too much from the historical data model, an alarm is generated and a fault is declared.

Prior fault detection methods typically relied on historical data to generate estimates of observed operational values expected to be measured by a particular sensor. Then, actual operational values were measured by the sensors and compared to the estimates. The sensor residue, or the difference between the estimate and the observed value, is then calculated and, if the residue is higher than a desired threshold, a fault is declared. However, in such prior sensor estimation techniques, estimates of a particular sensor were frequently affected by measurements taken by faulty sensors. Specifically, typical prior estimation techniques relied on measurements from several sensors measuring the same characteristic (e.g., multiple sensors measuring blade temperature in a turbine engine) to produce an estimate of the expected value from an individual sensor. Such a measurement derived from several sensors is referred to herein as a vector. These techniques typically minimized errors between the estimates and original values and, therefore, tended to spread any deviations between the values of the individual sensors among all the sensors. As a result, if one sensor was faulty and, therefore, produced a significant error in its measurement, that error would be shared by all of the non-faulty sensors, thus reducing the accuracy of the overall estimate from each of the sensors. This sharing of error is referred to herein as the spillover effect.

In order to reduce such spillover, various estimation techniques have been used, such as techniques using the well-known gradient descent functions to search for solutions. For examples of such methods, see P. J. Huber, "Robust Statistics", Wiley-Interscience, 1981. However, these methods require the selection of a control parameter to control how quickly the function converged. Selecting such control parameters accurately is difficult. Additionally, such methods tended to converge to an optimal estimate slowly and, therefore, are impractical in many operational uses. Other attempts at reducing the effect of spillover include methods involving regression, such as the well-known kernel regression or multivariate state estimation techniques (MSET). Such techniques are described more fully in A. V. Gribok, J. W. Hines and R/E. Uhrig, "Use of Kernel Based Techniques for Sensor Validation", Int'l Topical Meeting on Nuclear Plant Instrumentation, Controls, and Human-Machine Interface Technologies, Washington D.C., November, 2000, which is hereby incorporated by reference herein in its entirety. However, these regression methods are computationally intensive, requiring a number of regression networks equal to the number of sensors. Additionally, such regression models are inaccurate when faulty sensors are present.

SUMMARY OF THE INVENTION

The present inventors have invented a method and apparatus for detecting faults in equipment using sensor confidence and an improved method of identifying the normal operating range of the power generation equipment as measured by those sensors.

Specifically, in accordance with one embodiment of the present invention, a confidence is assigned to a sensor in proportion to the residue associated with that sensor. If the sensor has high residue, a small confidence is assigned to the sensor. If a sensor has a low residue, a high confidence is assigned to that sensor, and appropriate weighting of that sensor with other sensors is provided. This confidence is then used to produce a revised estimate of an observed value of a characteristic of power generation equipment.

In accordance with another embodiment of the present invention, a feature space trajectory (FST) method is used to model the normal operating range curve distribution of power generation equipment characteristics. In particular, such an FST method is illustratively used in conjunction with a minimum spanning tree (MST) method to identify a plurality of nodes and to then connect those with line segments that approximate a curve. Once this curve is approximated, the methods for determining sensor confidence, discussed above, can be used to determine and an improved sensor estimate.

These and other advantages of the invention will be apparent to those of ordinary skill in the art by reference to the following detailed description and the accompanying drawings.

DETAILED DESCRIPTION

Figure 1:
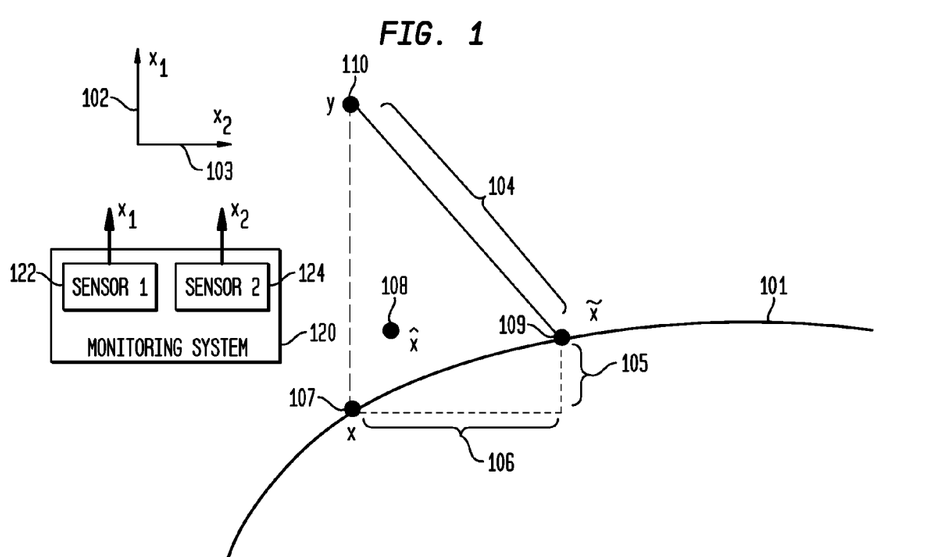
FIG. 1 shows an illustrative plot of sensor vector estimates and observed values collected by a monitoring system, and how those estimates/values can be compared to the normal operating range of an illustrative turbine engine.

FIG. 1 shows an illustrative plot of sensor vector estimates and observed values collected by a monitoring system, and how those estimates/values can be compared to the normal operating range of, for example, the temperature of a component in a turbine engine used to generate power. Specifically, referring to FIG. 1, two sensors, herein designated as sensor 1 122 and sensor 2 124 are part of a monitoring system 120. Sensor 1 122 is, for example, a faulty sensor and sensor 2 124 is, for example, a sensor that is not faulty. These sensors 122 and 124 are, for example, sensors positioned to monitor an operational characteristic of the aforementioned turbine engine, such as, illustratively, the blade path temperature of the blades in a turbine engine. As one skilled in the art will recognize, and as can be seen by FIG. 1, multiple temperature measurements, such as measurements taken by sensor 1 122 and sensor 2 124, respectively, can be represented by vectors 102 and 103. Specifically, vectors 102 and 103 in the vertical direction and the horizontal direction, respectively, represent the measurement of, for example, the blade path temperature measurements $x_1$ (measured by sensor 1 122) and $x_2$ (measured by sensor 2 124). Thus, instead of using a simple one-dimensional range of temperature measurements from a single sensor, the measurements form a two-dimensional graph that is a function of the temperature measurements $x_1$ and $x_2$ from sensor 1 122 and sensor 2 124, respectively. Accordingly, each point in FIG. 1 represents a vertical component representing one or more measurements taken by sensor 1 122 and a horizontal component representing one or more measurements taken by sensor 2 124.

Normal operating range 101 is a curve representing the normal operating range of, for example, power generation equipment and is determined through well-known learning techniques in which historical data associated with the operation of that power generation equipment can be collected by sensors placed at desired locations on that equipment. This data, or a portion of this data, is used to estimate and characterize the normal operating range of the equipment using well-known statistical modeling techniques. In operations of the equipment, if a measurement significantly deviates from the calculated normal operating range, a fault could be declared. Determining the normal operating range curve 101 of the power generation equipment is also discussed further herein below.

Referring once again to FIG. 1, once the normal operating range 101 is determined, a measurement of the operational characteristic (such as temperature) can then be taken by sensor 1 122 and sensor 2 124. Vector x 107 represents the position of an ideal estimate of the temperature values measured by sensor 1 122 and sensor 2 124 or, in other words, the actual operating blade path temperature. However, assume once again that sensor 1 122 is a faulty sensor and, hence its measurement will be inaccurate. As shown in FIG. 1, in such a case, the result of these measurements taken by sensor 1 122 and sensor 2 124 is observed vector y 110. As can be seen, vector y 110 is offset in the vertical direction from ideal estimate x 107 by an amount attributable to the error introduced by faulty sensor 1 122. This vertical offset is referred to herein as the sensor residue of sensor 2 124 and is directly attributable to the fault in sensor 1 122.

In prior fault detection systems, once an observed value, such as sensor vector y, was measured, an attempt was typically made to minimize any errors in the measured value. This attempt usually involved mapping the observed vector to the closest point in the normal operating range and treating that closest point as the actual measured value. Referring to FIG. 1, the error represented by vector y 110 with respect to the normal operating range of the equipment is minimized, according to this method, by determining the closest point on normal operating range 101 to vector y 110. This closest point is represented by $\tilde{x}$ 109, which is the point located on normal operating range 101 at the minimum distance 104 from vector y 110. Point $\tilde{x}$ 109 is offset from ideal estimate x 107 in both the vertical and horizontal directions by distances 105 and 106, respectively. One skilled in the art will observe that, while the original observed vector y 110 was not offset with respect to x 107 in the horizontal direction, point $\tilde{x}$ 109 is offset by distance 106. Distance 106 is referred to herein as the spillover error of sensor 2 124 which, as discussed above, is the error introduced into the measurements of a normally-operating sensor by faulty sensor 1 122. In this case, the spillover results directly from attempting to map the observed vector y 110, which is erroneous due to faulty sensor 1 122, onto the normal operating range.

Figure 2:
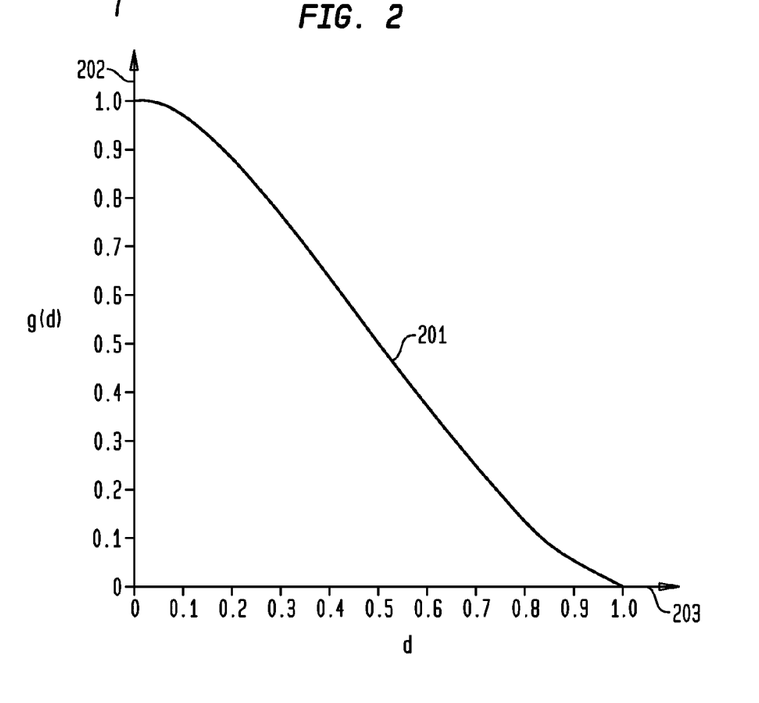
FIG. 2 shows an illustrative graph of an illustrative sensor confidence function useful in assigning confidence to sensors in accordance with the principles of the present invention.

In accordance with the principles of the present invention, the spillover problem is substantially eliminated. In particular, in accordance with one embodiment of the present invention, a confidence is assigned to a sensor in proportion to the residue associated with that sensor. If the sensor has high residue, a small confidence is assigned to the sensor. If a sensor has a low residue, a high confidence is assigned to that sensor, and appropriate weighting of that sensor with other sensors is provided. In particular, a confidence, $w_i$, is defined for the i-th sensor:

$$w_i = g(d_i) \quad \text{Equation 1}$$

where $w_i$ is the confidence of the i-th sensor, and $d_i$ is the normalized absolute difference between the observed sensor value and the estimated sensor value for the i-th sensor. As the difference between the sensor value and the estimated value increases for a particular sensor increases, the residue associated with that sensor increases. In particular, $d_i$ is defined as:

$$d_i = \frac{|\tilde{x}_i - y_i|}{|\tilde{x} - y|} \quad \text{Equation 2}$$

where, once again, $\tilde{x}$ is the estimate of a sensor vector from all sensors combined using traditional statistical modeling; $\tilde{x}_i$ is the estimate of a sensor vector using such modeling from the i-th sensor; $y_i$ is the observed sensor vector at the i-th sensor; and y is the observed sensor vector as measured from all sensors combined. This normalized absolute difference is used to reduce scaling effects of the residues for different sensors. FIG. 2 shows an illustrative graph of one illustrative confidence function 201 useful in assigning confidence to sensors in accordance with the method described herein. Referring to FIG. 2 again, as one skilled in the art will recognize, the confidence $g(d_i)$ along the vertical axis 202 assigned to a sensor is a decreasing function from 1 to 0 as $d_i$ increases, as represented by the horizontal axis 203. In particular, FIG. 2 shows an illustrative confidence function g(d) defined by the equation:

$$g(d)=\exp(\gamma d^2) \quad \text{Equation 3}$$

where d is as defined above and γ is a selected convergence where γ<0. Illustratively, as shown by the graph of FIG. 2, γ is selected illustratively in a way such that g(1)=0.001.

By using such a confidence function, an updated, more accurate estimate $\hat{x}$ of a sensor vector can be obtained. In particular, $\hat{x}_i$ for the i-th sensor such an improved estimate of a sensor vector can be calculated by:

$$\hat{x}_i = w_i \cdot y_i + (1-w_i) \cdot \tilde{x}_i \quad \text{Equation 4}$$

where the variables in equation 4 are as described above. As can be seen in FIG. 1, the new updated $\hat{x}$ is significantly horizontally closer to the ideal estimate x and, as a result, the spillover effect attributed to the faulty sensor 1 is greatly reduced.

Figure 3:
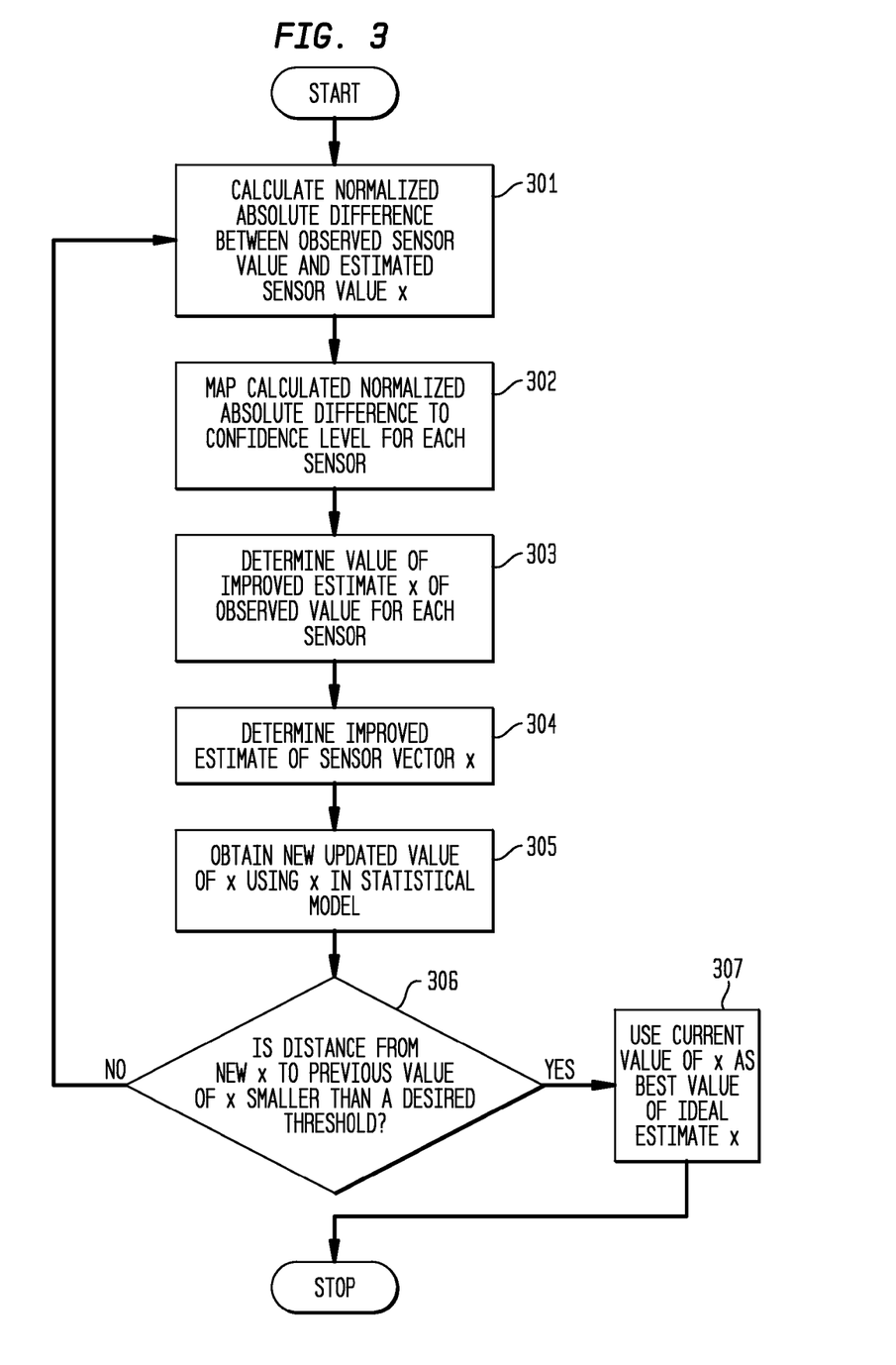
FIG. 3 shows a method in accordance with one embodiment of the present invention whereby an improved estimate of x is obtained using the sensor confidence function of FIG. 2.

FIG. 3 shows a method in accordance with one embodiment of the present invention whereby an improved estimate of x is obtained using the above equations and the sensor confidence function of FIG. 2. Specifically, referring to FIG. 3, at step 301, observed sensor vector y is input into Equation 2 in order to calculate the normalized absolute difference, $d_i$, between the observed sensor value y and the estimated sensor value $\tilde{x}$. Next, at step 302, this calculated value of $d_i$ is then mapped to a particular confidence level $w_i=g(d_i)$ using the illustrative confidence function represented by FIG. 2 and as discussed above. Once the value of $w_i$ is determined, at step 303, the observed sensor vector $y_i$ and the original estimated value $\tilde{x}_i$ are entered into the equation 4 to obtain the value of $\hat{x}_i$ as discussed above. Once this value is calculated for each sensor, at step 304, a new $\hat{x}$ is calculated which is an improved estimate of the observed sensor vector that has been refined to take into account the reduced confidence assigned to sensor 1. Next, at step 305, this new value of $\hat{x}$ is then entered into the statistical model to determine a new, updated value of $\tilde{x}$. At step 306, a determination is made whether the distance from the new $\tilde{x}$ to the previously computed $\tilde{x}$ is smaller than a desired threshold. If so, then at step 307, the current value of $\tilde{x}$ is used as the best value of the ideal estimate x. If, on the other hand, at step 305, the distance from the new $\tilde{x}$ is larger than a desired threshold, then the process returns to step 301 and the new value of $\tilde{x}$ is then used to calculate an updated $d_i$ according to equation 2 and, a new value for $\hat{x}_i$. The process continues as described above until the distance from the current value of $\tilde{x}$ to the previous value of $\tilde{x}$ is less than the desired threshold. In this manner, a confidence level is assigned to a sensor, thus significantly reducing the spillover of faulty sensor measurements on normally operating sensors.

In order to ensure that the sensor confidence method described above is accurate, it is necessary to ensure that the identification of the normal operating range, such as curve 101 in FIG. 1, is accurately identified. The present inventors have recognized that, in many instances, operational equipment, such as power generation equipment, has one or more sets of highly correlated sensors, such as the aforementioned blade path temperature sensors in a turbine engine. These sensors are termed highly correlated because these sensors are physically located in known positions relative to one another and future measurements from one sensor can be relatively accurately predicted, absent faults, by the measurements from another sensor. As one skilled in the art will recognize, due to this correlation, the distribution of any pair of highly correlated sensors in a two-dimensional space resembles a curve. Due to this correlation, it can be assumed that the distribution of sensor vectors consisting of measurements taken by these sensors is also a curve. In order to produce a curve based on historical sensor measurements and, therefore, to obtain a normal operating range curve of the power generation equipment, well-known methods using principle curves and their equally well-known variations have been employed. Specifically, such methods involve determining a curve that passes through the center of the training data in the sensor vector space. However, such methods are frequently inadequate as they do not converge properly to a desired curve, especially when the curve is a complex shape. As a result, a specific curve representing the normal operating range of the power generation equipment is sometimes difficult to determine.

Figure 4:
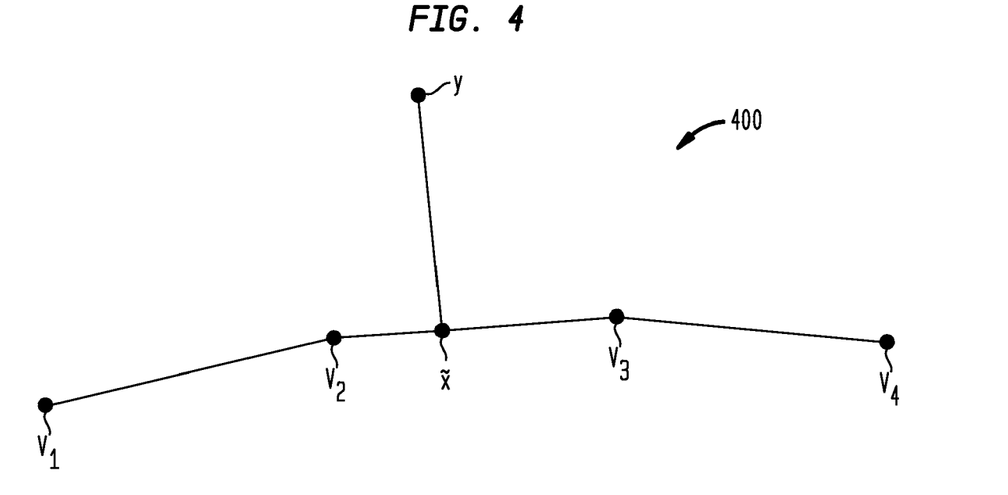
FIG. 4 shows an illustrative feature space trajectory (FST) model of a normal operating range of one characteristic of power generation equipment.

Therefore, the present inventors have recognized that feature space trajectory methods can be employed to model the normal operating range curve distribution of power generation equipment characteristics. Such feature space methods are generally well known in other fields, such as image recognition and, therefore, will only be described herein as necessary to understand the principles of the present invention. Such FST methods are generally useful to identify a plurality of nodes and to then connect those with line segments that approximate a curve. FIG. 4 shows one illustrative FST model, further discussed below, which in this case consists of three line segments $v_1v_2$, $v_2v_3$ and $v_3v_4$. Test input vector y is used once again to statistically obtain the value for $\tilde{x}$, as described above, which, in this illustrative example, is the estimate producing the smallest distance 401 between y and the line segments. As discussed previously, once the value $\tilde{x}$ is determined, sensor confidence can be determined and an improved sensor estimate can be iteratively produced.

In order to compute an FST, such as the FST 400 of FIG. 4, typically the nodes, such as nodes $v_1$, $v_2$, $v_3$ and $v_4$ in FIG. 4 must be known and the order of those nodes must also be known such that the nodes are connected one by one to form a curve. However, in the present case, both nodes in the training data and their order are unknown and, therefore, this information must be derived from the set of training sensor vector data. Therefore, the present inventors have recognized that k-mean clustering can be used to determine the sensor vectors that are present in the training data and to then derive nodes for use in the FST. In such k-mean clustering, a plurality of centroid positions are identified in a set of data by determining the distance between data points in a set of data (e.g., sensor training data) and the centroid positions and grouping data points based on the minimum distance between each point and one of the centroids. Such clustering is well-known and will not be described further herein.

Figure 5:
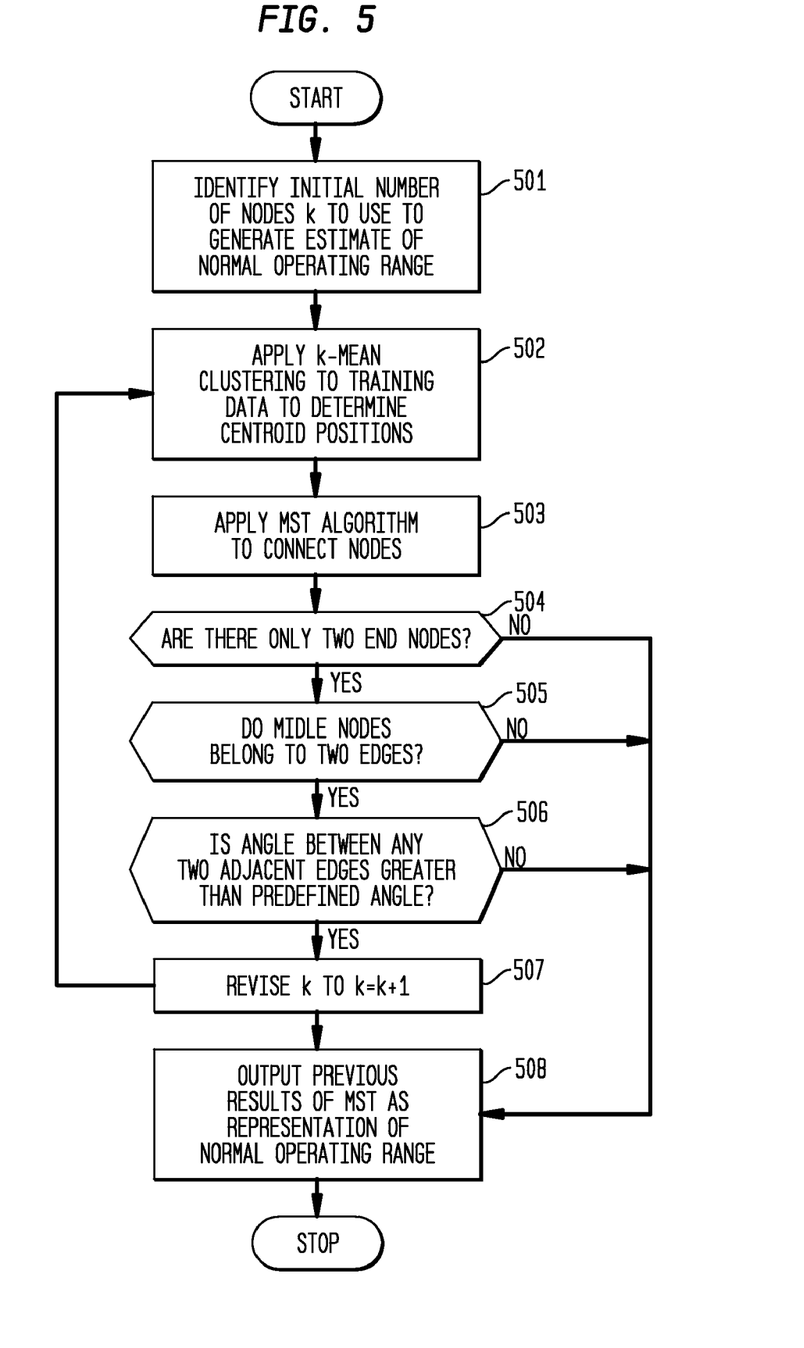
FIG. 5 shows one method in accordance with the principles of the present invention whereby the FST model of FIG. 4 is developed.
Figure 6:
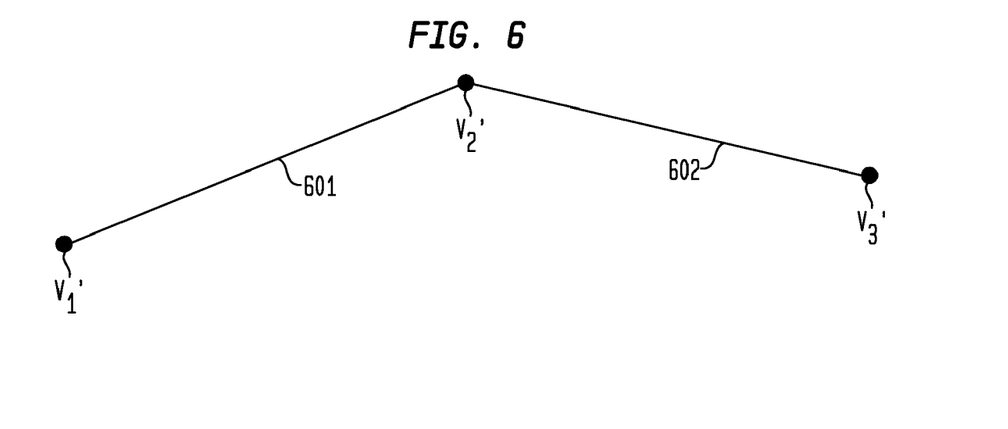
FIG. 6 shows a feature space trajectory using the training data represented by the curve in FIG. 4 wherein three centroid positions $v'_1$, $v'_2$ and $v'_3$ are illustratively identified and connected using minimum spanning tree (MST) methods.

Once the nodes have been identified, it is necessary to determine the order of the nodes and to connect them according to that order. In accordance with one embodiment of the principles of the present invention, a minimum spanning tree (MST) algorithm is used to accomplish this task. As is well-known, MST algorithms are useful in connecting a plurality of points in a way such that the sum of the lengths of the connections (the span) is a minimum. The result is frequently graphically portrayed as a tree-like graph. However, in the present case, the desired tree is intended to model the normal operating range of the power generation equipment. As such, the present inventors have recognized that, by applying certain constraints to the functions of the MST algorithm, it is possible to connect the nodes generated by the FST method described above and accurately model the normal operating range curve. Specifically, FIG. 5 shows a method in accordance with one embodiment of the present invention whereby the FST of FIG. 4 is developed. In particular, at step 501, an initial number k of nodes to be connected is identified, in this case k=3. This number corresponds to the number of centroids to be initially identified in the training data and is also the minimum number of points necessary to model a curve (two points would only result in a straight line connecting those two points. Next at step 502, a k-mean algorithm is applied to identify the three centroid positions. Referring to FIG. 6, using the training data represented by the curve in FIG. 4, three centroid positions $v'_1$, $v'_2$ and $v'_3$ are illustratively identified. Next, at step 503, the MST algorithm is applied, as described above, to these k-nodes to connect them in order, represented by lines 601 and 602 in FIG. 6. However, in order to ensure these nodes form a curve, at step 504 a determination is made whether there are two end nodes belonging to one edge (i.e., are connected to only one other node). If yes, at step 505, a determination is made whether all remaining nodes (e.g., between the two edge nodes) belong to two edges (i.e., are connected to two and only two other nodes). Steps 504 and 505 function to ensure that the nodes form a model of a curve and not some other shape, such as a tree with separate individual segments. If, at step 505, the determination is made that each middle node belongs to two edges, then, at step 506, a further determination is made whether the angle θ formed between adjacent edges is greater than a predefined angle such as, illustratively, 30 degrees. This is to prevent the MST from forming a boundary to the training data having jagged edges. If the determination at step 506 is yes, then, at step 507, k is revised to k=k+1, in this case k=4, and the process returns to step 502. In this case, when k=4 the illustrative FST of FIG. 4 would be developed having line segments $v_1v_2$, $v_2v_3$ and $v_3v_4$. As will be obvious to one skilled in the art, the greater the number of nodes complying with the above constraints, the more precise the estimation of the normal operating range 101 of FIG. 1. Therefore, the above process iteratively continues with increasing values of k until one of the determinations at steps 504, 505 or 506 is no. In this case, at step 508, the results of the MST process are output as the final representation of the normal operating range of the power generation equipment as determined by the training data.

Figure 7:
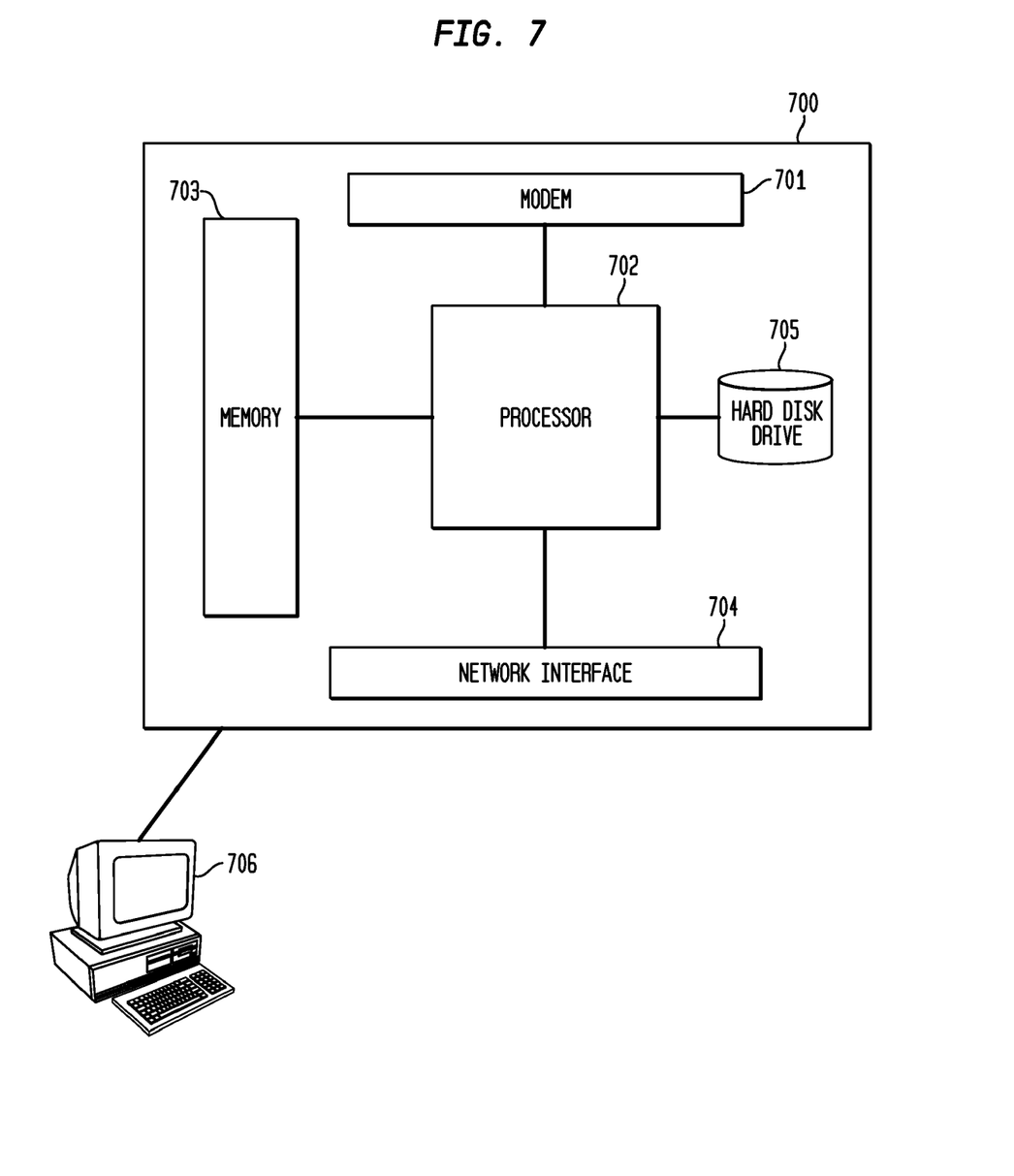
FIG. 7 shows a schematic diagram of a computer adapted to calculate sensor confidence values and/or perform calculations and determinations associated with the FST/MST methods for determining the normal operating range of power generation equipment.

One skilled in the art will recognize that a monitoring system using sensor confidence values and/or an FST/MST method for determining the normal operating range of power generation equipment, such as that discussed above may be implemented on a programmable computer adapted to perform the steps of a computer program to calculate the functions of the confidence values and/or the FST/MST. Referring to FIG. 7, such a monitoring system 700 may be implemented on any suitable computer adapted to receive, store and transmit data such as the aforementioned phonebook information. Specifically, illustrative monitoring system 700 may have, for example, a processor 702 (or multiple processors) which controls the overall operation of the monitoring system 700. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. Monitoring system 700 also comprises illustrative modem 701 and network interface 704. Monitoring system 700 also illustratively comprises a storage medium, such as a computer hard disk drive 705 for storing, for example, data and computer programs adapted for use in accordance with the principles of the present invention as described hereinabove. Finally, monitoring system 700 also illustratively comprises one or more input/output devices, represented in FIG. 7 as terminal 706, for allowing interaction with, for example, a technician or database administrator. One skilled in the art will recognize that address monitoring system 700 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for improving operational data measurements in an apparatus having a monitoring system, said monitoring system comprising a plurality of sensors, said method comprising:
   receiving from a sensor in said plurality of sensors a measurement by said sensor of an observed condition of said apparatus;
   determining, via said monitoring system, a confidence level for said sensor as a function of said measurement;
   determining, via said monitoring system, an estimate of said measurement as a function of said confidence level; and
   using said estimate of said measurement for fault detection in said apparatus.

2. The method of claim 1 wherein said apparatus comprises power generation equipment.

3. The method of claim 1 wherein said step of determining a confidence level comprises calculating the expression:

$$d_i = \frac{|\tilde{x}_i - y_i|}{|\tilde{x} - y|}$$

where $\tilde{x}$ is an estimate of a sensor vector from all sensors combined using statistical modeling; $\tilde{x}_i$ is an estimate of a sensor vector from the i-th sensor; $d_i$ is a normalized absolute difference between said measurement and an estimate for said i-th sensor measurement; and $y_i$ is an observed sensor vector at the i-th sensor.

4. The method of claim 1 wherein said step of determining an estimate comprises calculating the expression:

$$\hat{x}_i = w_i \cdot y_i + (1 - w_i) \cdot \tilde{x}_i$$

where $w_i$ is a confidence of the i-th sensor; $\hat{x}_i$ is an improved estimate of said measurement; $\tilde{x}_i$ is an estimate of a sensor vector from the i-th sensor; and $y_i$ is an observed sensor vector at the i-th sensor.

5. The method of claim 1 wherein said step of determining a confidence level comprises:
   calculating a normalized absolute difference between an observed sensor value and an estimated sensor value $\tilde{x}$; and mapping said normalized absolute difference to a confidence level.

6. The method of claim 5 wherein said step of mapping comprises mapping said normalized absolute difference to a confidence level function, said function defined by the expression:

$$g(d)=\exp(\gamma d^2)$$

where d is the normalized absolute difference; and $\gamma$ is a selected convergence factor.

7. The method of claim 6 wherein $\gamma$ is selected in a way such that g(1)=0.001.

8. The method of claim 5 wherein calculating a normalized absolute difference between an observed sensor value and an estimated sensor value $\tilde{x}$ comprises:
   determining a plurality of nodes in a set of training data, said nodes representing a normal operating range; and
   estimating a curve representing said normal operating range of said apparatus by connecting each node in said plurality of nodes with at least one other node in a way such that the sum of the length of said connections is a minimum.

9. The method of claim 8 wherein said estimated sensor value $\tilde{x}$ is a vector located on said curve.

10. The method of claim 1 further comprising using said estimate of said measurement in place of said measurement to represent said observed condition for fault detection in said apparatus.

11. An apparatus for improving operational data measurements in equipment having a monitoring system, said monitoring system comprising a plurality of sensors, said apparatus comprising:
   means for receiving from a sensor in said plurality of sensors a measurement by said sensor of an observed condition of said apparatus;
   means for determining a confidence level for said sensor using said measurement; and
   means for determining an estimate of said measurement as a function of said confidence level.

12. The apparatus of claim 11 wherein said equipment comprises power generation equipment.

13. The apparatus of claim 11 wherein said means for determining a confidence level comprises means for calculating the expression:

$$d_i = \frac{|\tilde{x}_i - y_i|}{|\tilde{x} - y|}$$

where $\tilde{x}$ is an estimate of a sensor vector from all sensors combined using statistical modeling; $\tilde{x}_i$ is an estimate of a sensor vector from the i-th sensor; $d_i$ is a normalized absolute difference between said measurement and the estimate for said i-th sensor; and $y_i$ is an observed sensor vector at the i-th sensor.

14. The apparatus of claim 11 wherein said means for determining an estimate comprises means for calculating the expression:

$$\hat{x}_i = w_i \cdot y_i + (1-w_i) \cdot \tilde{x}_i$$

where $w_i$ is a confidence of the i-th sensor; $\hat{x}_i$ is an improved estimate of said measurement; $\tilde{x}_i$ is an estimate of a sensor vector from the i-th sensor; and $y_i$ is the observed sensor vector at the i-th sensor.

15. The apparatus of claim 11 wherein said means for determining a confidence level comprises:
   means for calculating a normalized absolute difference between an observed sensor value and an estimated sensor value $\tilde{x}$; and
   means for mapping said normalized absolute difference to a confidence level.

16. The apparatus of claim 15 wherein said means for mapping comprises means for mapping said normalized absolute difference to a confidence level function, said function defined by the expression:

$$g(d)=\exp(\gamma d^2)$$

where d is the normalized absolute difference; and $\gamma$ is a selected convergence factor.

17. The apparatus of claim 16 wherein $\gamma$ is selected in a way such that g(1)=0.001.

18. The apparatus of claim 15 wherein said means for calculating a normalized absolute difference between an observed sensor value and an estimated sensor value $\tilde{x}$ comprises:
   means for determining a plurality of nodes in a set of training data, said nodes representing a normal operating range; and
   means for estimating a curve representing said normal operating range of said apparatus by connecting each node in said plurality of nodes with at least one other node in a way such that the sum of the length of said connections is a minimum.

19. The apparatus of claim 18 wherein said estimated sensor value $\tilde{x}$ is a vector located on said curve.

20. A method for improving operational data measurements in an apparatus having a monitoring system, said monitoring system adapted to compare at least a first observed value associated with one operating characteristic of said apparatus to a normal operating range of that characteristic, said method comprising:
   determining, via said monitoring system, a plurality of nodes from a set of training data, said nodes representing said normal operating range of said apparatus;
   connecting each node in said plurality of nodes with at least one other node in a way such that the sum of the length of said connections is a minimum, said connections forming a curve defining said normal operating range of said apparatus; and
   using said curve for fault detection in said apparatus.

21. The method of claim 20 wherein said step of determining comprises identifying a plurality of centroids in a set of training data using a k-mean clustering algorithm.

22. The method of claim 21 wherein said step of determining a plurality of nodes comprises determining the distance from each element of data in said training data to at least one centroid.

23. The method of claim 22 wherein said step of determining a plurality of nodes comprises forming a plurality of nodes by associating each element of data to the at least one centroid to which said element is closest.

24. The method of claim 23 wherein said nodes are connected using a minimum spanning tree method.

25. A monitoring system for detecting fault conditions in equipment comprising:
   a first sensor in a plurality of sensors for taking a measurement of an observed condition of said equipment;
   means for determining a confidence level for said sensor using said measurement; and
   means for determining an estimate of said measurement as a function of said confidence level.

26. The monitoring system of claim 25 wherein said equipment comprises power generation equipment.

27. The monitoring system of claim 25 wherein said means for determining a confidence level comprises means for calculating the expression:

$$d_i = \frac{|\tilde{x}_i - y_i|}{|\tilde{x} - y|}$$

where $\tilde{x}$ is an estimate of a sensor vector from all sensors combined using statistical modeling; $\tilde{x}_i$ is an estimate of a sensor vector from the i-th sensor; $d_i$ is the normalized absolute difference between said measurement and an estimate for said i-th sensor; and $y_i$ is the observed sensor vector at the i-th sensor.

28. The monitoring system of claim 25 wherein said means for determining an estimate comprises means for calculating the expression:

$$\hat{x}_i = w_i \cdot y_i + (1-w_i) \cdot \tilde{x}_i$$

where $w_i$ is a confidence of the i-th sensor; $\hat{x}_i$ is an improved estimate of said measurement; $\tilde{x}_i$ is an estimate of a sensor vector from the i-th sensor; and $y_i$ is an observed sensor vector at the i-th sensor.

29. The monitoring system of claim 25 wherein said means for determining a confidence level comprises:
   means for calculating a normalized absolute difference between an observed sensor value and an estimated sensor value $\tilde{x}$; and
   means for mapping said normalized absolute difference to a confidence level.

30. The monitoring system of claim 29 wherein said means for mapping comprises means for mapping said normalized absolute difference to a confidence level function, said function defined by the expression:

$$g(d) = \exp(\gamma d^2)$$

where d is the normalized absolute difference; and $\gamma$ is a selected convergence factor.

31. The monitoring system of claim 30 wherein $\gamma$ is selected in a way such that $g(1)=0.001$.

32. The monitoring system of claim 29 wherein said means for calculating a normalized absolute difference between an observed sensor value and an estimated sensor value $\tilde{x}$ comprises:
   means for determining a plurality of nodes in a set of training data, said nodes representing a normal operating range; and
   means for estimating a curve representing said normal operating range of said monitoring system by connecting each node in said plurality of nodes with at least one other node in a way such that the sum of the length of said connections is a minimum.

33. The monitoring system of claim 32 wherein said estimated sensor value $\tilde{x}$ is a vector located on said curve.

* * * * *